United States Patent
Inoue et al.

[19]

[11] Patent Number: 6,096,400
[45] Date of Patent: Aug. 1, 2000

[54] OPTICAL RECORDING MEDIUM

[75] Inventors: Hiroyasu Inoue; Tatsuya Kato; Hajime Utsunomiya, all of Nagano, Japan

[73] Assignee: TDK Corporation, Tokyo, Japan

[21] Appl. No.: 09/220,344

[22] Filed: Dec. 24, 1998

[30] Foreign Application Priority Data

Dec. 25, 1997 [JP] Japan .................................. 9-367343
Nov. 20, 1998 [JP] Japan .................................. 10-347947

[51] Int. Cl.⁷ ...................................................... B32B 3/02
[52] U.S. Cl. ............................................................. 428/64.1
[58] Field of Search .................................. 428/64.1, 64.2, 428/64.4, 64.5, 64.6, 913; 430/270.13, 495.1, 945; 369/275.1, 275.4, 283, 288

[56] References Cited

U.S. PATENT DOCUMENTS

| | | | |
|---|---|---|---|
| 5,650,992 | 7/1997 | Ohkubo | 369/275.1 |
| 5,719,006 | 2/1998 | Ohkubo | 430/270.13 |
| 5,978,349 | 11/1999 | Yoshinari | 369/275.1 |
| 6,040,030 | 3/2000 | Utsunomiya | 428/64.1 |

FOREIGN PATENT DOCUMENTS 5-282705 10/1993 Japan .
7-134838 5/1995 Japan .
8-124218 5/1996 Japan .

*Primary Examiner*—Elizabeth Evans
*Attorney, Agent, or Firm*—Oblon, Spivak, McClelland, Maier & Neustadt, P.C.

[57] ABSTRACT

In a phase change-type optical recording medium of absorption coefficient control structure used by land/groove recording system, difference in reproduction characteristics between the land and the groove is minimized while ensuring sufficient output of the tracking signal. In the optical recording medium of the present invention, light absorption coefficient at the wavelength of said recording/reproducing beam is such that: $Ac/Aa \geq 0.8$ when light absorption coefficient in crystalline region is Ac and light absorption coefficient in amorphous region is Aa; relation between groove width $W_G$ and land width $W_L$ is such that: $x = 2W_G/(W_L + W_G) \geq 1.03$; and the relation: $\lambda max^i < \lambda u \leq \lambda min^i$, and $-100x + 123 \leq t_R \leq -100x + 126$ are satisfied when the wavelength of a local minimum in reflectance spectrum is $\lambda min^i$; the wavelength of the local maximum in the reflectance spectrum nearest to the $\lambda min^i$ in the wavelength range shorter than the $\lambda min^i$ is $\lambda max^i$; said recording/reproducing beam has a wavelength of $\lambda u$; and said recording layer has a thickness of $t_R$ (nm).

4 Claims, 2 Drawing Sheets

RECORDING/REPRODUCING BEAM

RECORDING/REPRODUCING BEAM

RECORDING/REPRODUCING BEAM

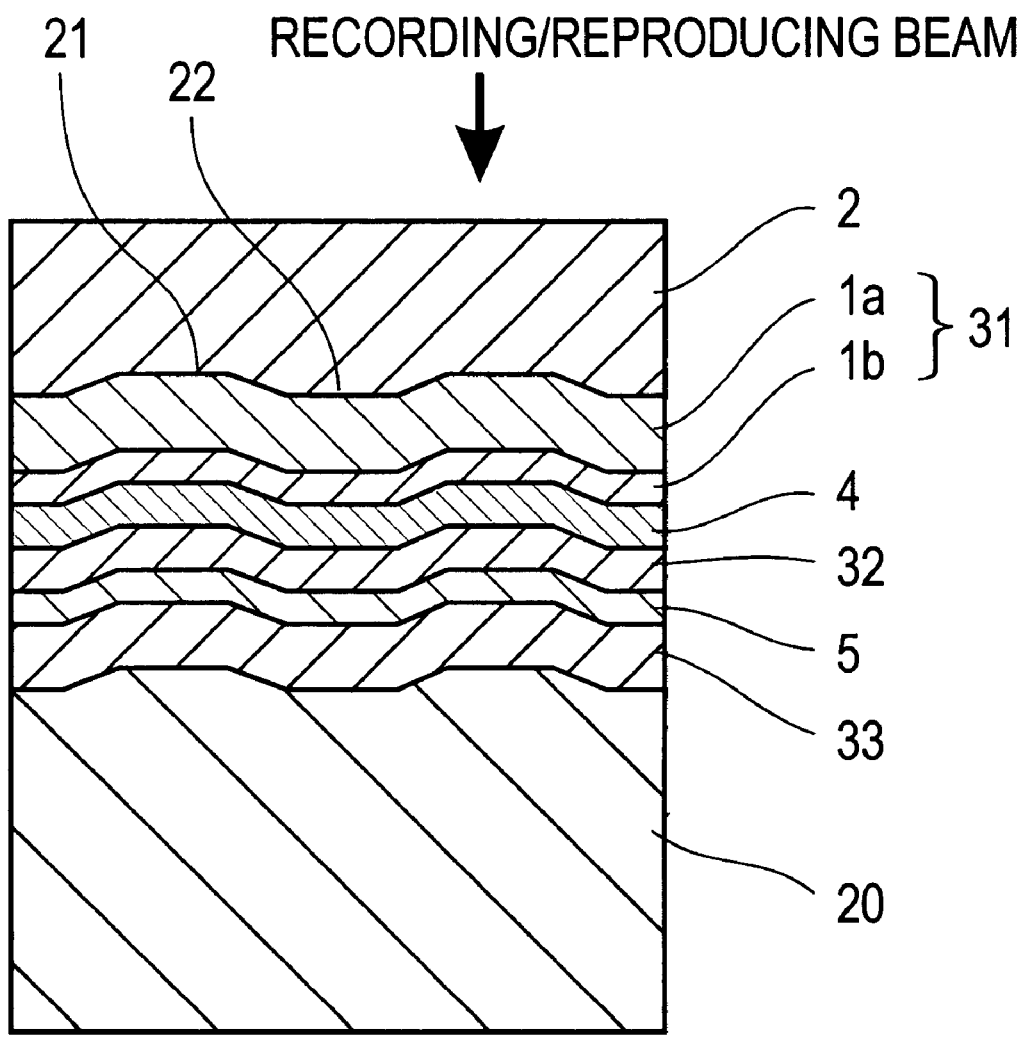

OPTICAL RECORDING MEDIUM

BACKGROUND OF THE INVENTION

1. Field of the Invention

This invention relates to a phase change optical recording medium.

2. Prior Art

Highlight is recently focused on optical recording media capable of recording information at a high density and erasing the recorded information for overwriting. One typical rewritable (or erasable) optical recording medium is of the phase change type wherein a laser beam is directed to the recording layer to change its crystalline state whereupon a change of reflectance by the crystallographic change is detected for reproduction of the information. The phase change optical recording media are of great interest since the optical system of the drive unit used for their operation is simple as compared with magneto-optical recording media.

Most optical recording media of phase change type used chalcogenide systems such as Ge-Te system and Ge-Sb-Te system which provide a substantial difference in reflectance between crystalline and amorphous states and have a relatively stable amorphous state. It was also recently proposed to use new compounds known as chalcopyrites. Chalcopyrite compounds have been investigated as compound semiconductor materials and have been applied to solar batteries and the like. The chalcopyrite compounds are composed of $Ib\text{-}IIIb\text{-}VIb_2$ or $IIb\text{-}IVb\text{-}Vb_2$ as expressed in terms of the Groups of the Periodic Table and have two stacked diamond structures. The structure of chalcopyrite compounds can be readily determined by X-ray structural analysis and their basic characteristics are described, for example, in Physics, Vol. 8, No. 8 (1987), pp. 441 and Denki Kagaku (Electrochemistry), Vol. 56, No. 4 (1988), pp. 228. Among the chalcopyrite compounds, $AgInTe_2$ is known to be applicable as a recording material by diluting it with Sb or Bi. The resulting optical recording media are generally operated at a linear velocity of about 7 m/s. See Japanese Patent Application Kokai Nos. (JP-A) 240590/1991, 99884/1991, 82593/1991, 73384/1991, and 151286/1992. In addition to the optical recording media of phase change type wherein chalcopyrite compounds are used, optical recording media of phase change type wherein $AgSbTe_2$ phase is formed with the crystallization of the recording layer is disclosed in JP-A 267192/1992, 232779/1992, and 166268/1994.

In the optical recording media of phase change type, a groove is formed in the substrate for the purpose of tracking, and address information is sometimes loaded in the groove. It has been common to form record marks in the groove, or in the region (land) formed between the adjacent grooves. Recently, land/groove recording has been proposed wherein both the land and the groove are used for the recording tracks to thereby reduce the track pitch and enable a high density recording (Japanese Patent Publication No. (JP-B) 57859/1988).

When the recording track pitch is reduced as in the case of the land/groove recording, spot of the laser beam used for the recording/reproduction will extend into the adjacent track to result in an increased crosstalk during the reproduction.

JP-A 282705/1993 proposes an optical recording medium wherein width of the land and width of the groove are substantially equal, and the depth of the groove (light path length) is adjusted to $1/7$ to $5/14$ of the recording/reproducing wavelength to thereby reduce crosstalk in the land/groove recording. JP-A 134838/1995 proposes an optical recording medium wherein width of the land and the groove are substantially equal and the depth of the groove is adjusted as in the case of the JP-A 282705/1993, and wherein relation between the thickness of the second dielectric layer on the recording layer and the thickness of the reflective layer on the second dielectric layer is limited to ensure consistent recording characteristics between the land and the groove.

However, the limitation of groove depth as described in JP-A 282705/1993 and JP-A 134838/1995, supra, is associated with the decrease in output of the push-pull signal for tracking. The output of the push-pull signal is highest when the groove depth (light path length) is $1/8$ of the recording/reproducing wavelength, and drastically reduces with the increase in the groove depth. When the groove depth is $1/7$ to $5/14$ of the recording/reproducing wavelength, tracking signal of the intensity required in mass-storage, high transfer rate optical recording medium is not obtained, and operation will be unstable.

The optical recording medium of phase change type utilizes difference in reflectance between the crystalline and the amorphous state, and light absorption (Ac) of the recording layer in the region other than record marks (in crystalline state) and the light absorption (Aa) of the recording layer in the record marks (in amorphous state) are often different, and the Ac<Aa is the condition generally found in such situation. It should be noted that Ac and Aa are values measured at the wavelength of the recording/reproducing laser beam. Recording sensitivity and erasability are thus different depending on whether the region overwritten is crystalline or amorphous, and consequently, the record marks of different length and width are formed by the overwriting to invite increase in the jitter often resulting in errors. When mark edge recording wherein the information is encoded in opposite edges of the record marks is adopted for increasing the recording density, variation in the length of the record marks has greater significance and such variation invites increased errors. In order to solve such situation, it is preferable that the difference between Ac and Aa is small, and more preferable that Ac>Aa in consideration of the latent heat. The relation of Ac>Aa may be realized by regulating the thickness of the recording layer or the dielectric layers sandwiching the recording layer. However, in the medium of conventional structure, the relation of Ac>Aa results in reduced difference between the reflectance (Rc) of the medium of the region other than the record marks and the reflectance (Ra) of the medium in the record marks, and hence, in a reduced C/N.

In view of such situation, JP-A 124218/1996 proposes an optical information recording medium comprising a substrate, a first dielectric layer, a recording layer, a second dielectric layer, a reflective layer, a third dielectric layer, and a UV cured resin layer disposed in this order wherein Ac>Aa, and an extremely thin metal film of high light transmission, Si or Ge is used for the reflective layer, and a dielectric material having a refractive index of higher than 1.5 is used for the third dielectric layer. The relation Ac>Aa is achieved without detracting from the high (Rc-Ra) by providing the reflective layer of high light transmission and the third dielectric layer of high refractive index. The structure wherein the difference between Ac and Aa is small or the structure wherein Ac>Aa is herein referred to as absorption coefficient control structure.

As summarized above, no effective suggestion has been made for ensuring both the tracking signal output of sufficient level and reduced crosstalk in an optical recording medium of absorption coefficient control structure.

SUMMARY OF THE INVENTION

An object of the present invention is to reduce the difference in the reproduction characteristics between the land and the groove while ensuring the tracking signal output of sufficient level in an optical recording medium of absorption coefficient control structure wherein the land/groove recording has been adopted.

Such object is achieved by the present invention as defined in (1) to (4), below.

(1) An optical recording medium comprising a substrate, and a first dielectric layer, a recording layer of phase change type, and a second dielectric layer formed on one surface of the substrate in this order, wherein recording/reproducing beam is irradiated from the other surface of the substrate, wherein said medium has a light absorption coefficient at the wavelength of said recording/reproducing beam such that:

$$Ac/Aa \geq 0.8$$

when light absorption coefficient in crystalline region is Ac and light absorption coefficient in amorphous region is Aa; said substrate has a groove and a land on its surface, and said groove has a width $W_G$ and said land defined between two adjacent grooves has a width $W_L$ such that:

$$x=2W_G/(W_L+W_G) \geq 1.03; \text{ and}$$

crosstalk in the reproduction of said land XL from the groove and crosstalk in the reproduction of said groove $X_G$ from the land are such that:

$$|X_L| \geq 20 \text{ dB},$$

$$|X_G| \geq 20 \text{ dB, and}$$

$$|X_L - X_G| \leq 5 \text{ dB},$$

when both the groove and the land are used for recording tracks.

(2) The optical recording medium of the above (1) wherein the relations:

$$\lambda max^i < \lambda u \leq \lambda min^i, \text{ and}$$

$$-100x+123 \leq t_R \leq -100x+126$$

are satisfied when the wavelength of a local minimum in reflectance spectrum is $\lambda min^i$; the wavelength of the local maximum in the reflectance spectrum nearest to the $\lambda min^i$ in the wavelength range shorter than the $\lambda min^i$ is $\lambda max^i$; said recording/reproducing beam has a wavelength of $\lambda u$; and said recording layer has a thickness of $t_R$ (nm).

(3) The optical recording medium of the above (1) or (2) wherein the medium has a reflective layer on the second dielectric layer, and the reflective layer is either the one comprising a metal having a thickness of up to 40 nm, or the one comprising Si or Ge having a thickness of up to 80 nm.

(4) The optical recording medium of the above (3) wherein the medium has a third dielectric layer on the reflective layer.

BRIEF DESCRIPTION OF THE DRAWINGS

FIG. 3 is a partial cross-sectional view of a further embodiment of the optical recording medium according to the present invention.

DETAILED DESCRIPTION OF THE INVENTION

Figure 1:
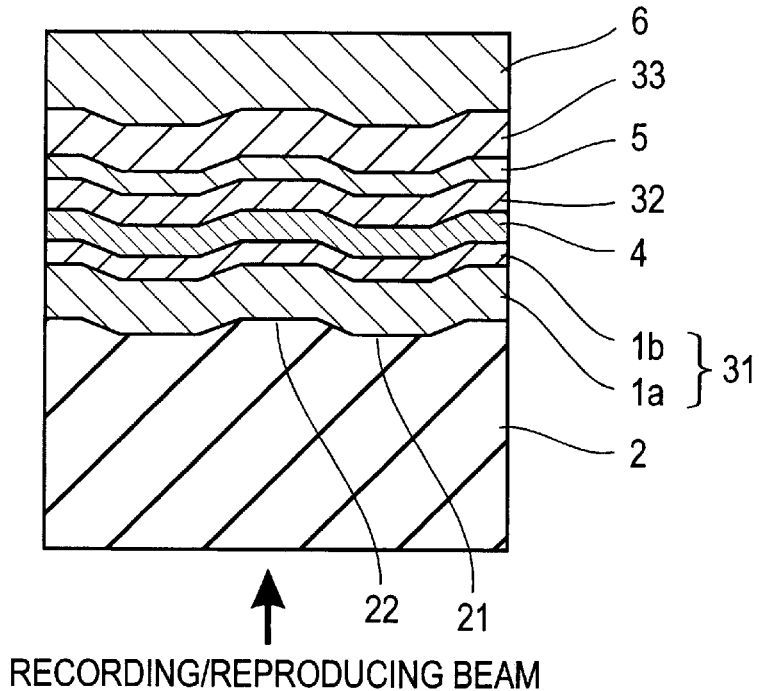
FIG. 1 is a partial cross-sectional view of an embodiment of the optical recording medium according to the present invention.

The present invention is applicable to an optical recording medium wherein both the land and the groove are used for the recording track, and which has the absorption coefficient control structure as described above.

In JP-A 282705/1993, supra, the land width and the groove width which are substantially equal to each other, and the groove depth (light path length) in the range of 1/7 to 5/14 of the recording/reproducing wavelength are employed in order to considerably decrease each of the crosstalk of the land and the crosstalk of the groove, namely, to increase each of the $|X_L|$ and $|X_G|$, and as a consequence, the medium suffered from reduced output of the tracking signal. JP-A 134838/1995, supra, shares the common problem of insufficient tracking signal output with the JP-A 282705/1993 since the groove depth is the same as the one employed in JP-A 282705/1993.

In contrast, the inventors of the present invention have found that $|X_L|$ and $|X_G|$ of the level in considerable excess of 20 dB is not necessary when the difference in crosstalk between the land and the groove is small, namely, when $|X_L-X_G| \leq 5$ dB. The inventors of the present invention have further found that, by employing the land width and the groove width which are not equal to each other but which are in the relation:

$$x=2W_G/(W_L+W_G) \geq 1.03, \text{ and designing the structure of the medium such that:}$$

$$\lambda max^i < \lambda u \leq \lambda min^i, \text{ and}$$

$$-100x+123 \leq t_R \leq -100x+126,$$

the relations:

$$|X_L-X_G| \leq 5 \text{ dB},$$

$$|X_L| \geq 20 \text{ dB, and}$$

$$|X_G| \geq 20 \text{ dB}$$

can be achieved even if the groove depth (light path length) is less than 1/7 or even 1/8 or less and the output of the tracking signal is increased to a sufficient level.

As described above, the present invention has enabled to decrease the crosstalk as well as the difference in the crosstalk between the recording tracks while maintaining the tracking signal output at a sufficient level in an optical recording medium wherein land/groove recording has been employed for the purpose of high density recording and absorption coefficient control structure has been employed for the purpose of reducing the jitter. As a consequence, jitter is reduced in the optical recording medium of the present invention to enable a high density recording. A stable tracking, and hence, a high transfer rate is also realized in the optical recording medium of the present invention.

It should be noted that JP-A 282705/1993 and JP-A 134838/1995, supra, are silent about the medium of the absorption coefficient control structure as employed in the present invention. JP-A 282705/1993 and JP-A 134838/1995 are also silent about the relation between $\lambda max^i$, $\lambda u$, and $\lambda min^i$. Furthermore, JP-A 282705/1993 does not refer to the thickness of the recording layer, and the thickness for the recording layer of 30 nm is the only thickness mentioned in JP-A 134838/1995.

PREFERRED EMBODIMENTS OF THE INVENTION

Next, the present invention is described in further detail by referring to the embodiments of the invention.

Figure 2:
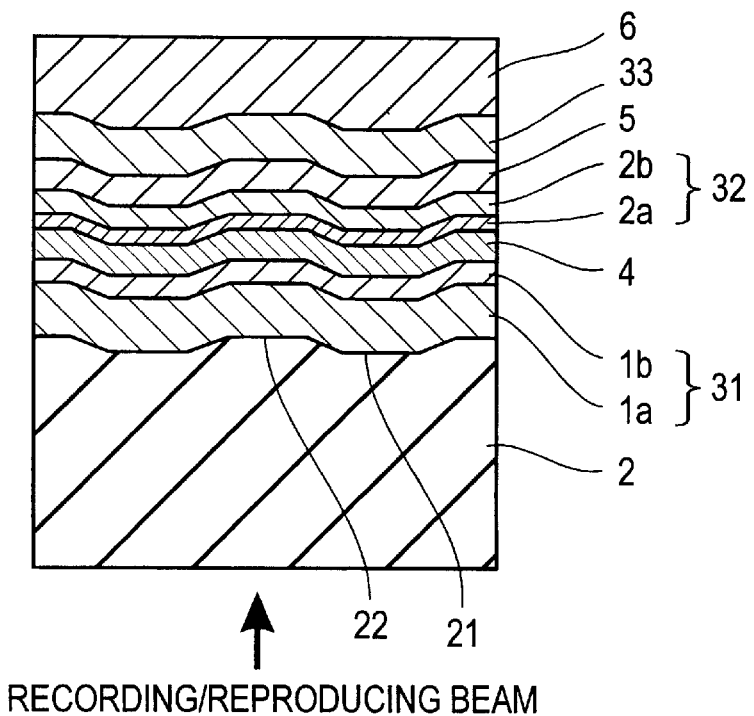
FIG. 2 is a partial cross-sectional view of another embodiment of the optical recording medium according to the present invention.

Embodiments of the optical recording medium of the present invention are shown in FIGS. 1 and 2. The optical recording media shown in FIGS. 1 and 2 are single side (single substrate) optical recording media which comprise a first dielectric layer 31, a recording layer 4, a second dielectric layer 32, a reflective layer 5, a third dielectric layer 33 and a protective layer 6 on a substrate 2 formed in this order. The present invention is also applicable for a double side recording medium comprising two single side recording media which are adhered to each other by an intervening adhesive layer such that the protective layer 6 is located in the interior side of the resulting medium. The present invention is also applicable for a medium comprising the single side recording medium as described above adhered to a protective substrate by an intervening adhesive layer.

These optical recording media are of the absorption coefficient control type as described above. In the optical recording medium of the present invention, the light absorption coefficient of the medium in crystalline region of the recording layer Ac and the light absorption coefficient in amorphous region Aa measured at the wavelength of the recording/reproducing laser beam is such that Ac/Aa≧0.8, preferably Ac/Aa≧0.9, more preferably Ac/Aa≧1, and still more preferably Ac/Aa>1 in consideration of the latent heat. As in the case of JP-A 124218/1996, an extremely thin metal film of high light transmission, Si, or Ge is used for the reflective layer 5, and the third dielectric layer 33 is formed.

It should be noted that Ac and Aa can be calculated from optical constants of the layers including the recording layer, the dielectric layers, and the reflective layer, and the wavelength of the recording/reproducing laser beam.

In the structure as described above wherein Ac/Aa are controlled to be within the range as specified above, the recording/reproducing laser beam is generally directed through the substrate, and the beam penetrates through the dielectric layers and the recording layer and goes out from the side of the reflective layer. The light transmittance in such instance is generally at least about 1%, and most preferably at least about 3%. It should be noted that the light transmittance is the value measured when the medium solely comprises the transparent substrate and the inorganic layers, and in the case of the construction of FIG. 1 or 2, the value measured for the medium with no protection layer 6. Therefore, the light transmittance is the value as a result of multiple reflection between the inorganic layers, that is, the recording layer, the dielectric layers, the reflective layer, and the like. The light transmittance can be measured with a spectrophotometer. The region measured is not particularly limited, and the light transmittance may be measured either for a crystalline region or for a amorphous region. The light transmittance, however, is generally measured for the crystalline region where no grooves are defined (mirror region).

Next, various parts of the optical recording media as shown in the drawings are described in detail for their constitution.

Substrate 2

In the optical recording medium of the present invention, the recording/reproducing beam is directed to the recording layer 4 through the substrate 2, and therefore, the substrate is preferably fabricated from a material which is transparent to the recording/reproducing beam, for example, a resin or a glass. Exemplary such resins include acrylic resins, polycarbonates, epoxy resins and polyolefins.

The substrate 2 has lands 22 and grooves 21 on opposite sides of the lands 22. The groove 21 is a concave, and the land 22 is a convex. Both the land 22 and the groove 21 are used for the recording tracks. The width $W_G$ of the groove 21 and the width $W_L$ of the land 22 are preferably such that:

$$x=2W_G/(W_L+W_G)\geq 1.03,$$

and preferably such that $$1.05\leq x\leq 1.10.$$

The merit of the present invention is not realized when x is too small, and an excessively small or large x results in the undesirably increased difference between the reproduction output in the land and the reproduction output in the groove.

In order to accomplish the high density recording, the recording track pitch is preferably up to 0.65 µm, and more preferably up to 0.6 µm. It should be noted that the recording track pitch is (groove width+land width)/2.

The depth $d_G$ of the groove 21 and the refractive index n of the substrate 2 at the wavelength of λ are preferably such that:

$$\lambda/10n\leq d_G<\lambda/7n$$

and more preferably such that:

$$\lambda/9n\leq d_G<\lambda/7n$$

When depth $d_G$ is too small, output of tracking error signal will be reduced and crosstalk will be increased. When depth $d_G$ is too large, output of the tracking error signal will be reduced and output of the reproduced signal will also be reduced.

The substrate 2 may have a thickness of up to 0.8 mm, and preferably, a thickness in the range of 0.2 to 0.65 mm. When the substrate is too thick, skew margin will be excessively small, while an excessively thin substrate 2 is likely to suffer from deformation, and hence, increased error. The shape of the substrate is not particularly limited. The substrate, however, is generally of disc shape, and the disc-shaped substrate generally has a diameter of about 50 to 360 mm.

In the embodiments shown in FIGS. 1 and 2, a resin or a glass plate of a thickness capable of maintaining its shape without any support from other members is used for the substrate 2. The present invention is also applicable for an optical recording medium wherein the thickness of the substrate has been further reduced for the purpose of improving the recording density. An embodiment of such medium is shown in FIG. 3.

The optical recording medium shown in FIG. 3 is a single side (single substrate) optical recording medium which comprises a third dielectric layer 33, a reflective layer 5, a second dielectric layer 32, a recording layer 4, a first dielectric layer 31, and a substrate 2 formed on a supporting substrate 20 in this order. The supporting substrate 20 in FIG. 3 comprises a resin or a glass plate of a thickness capable of maintaining its shape with no other support as in the case of the substrate 2 in FIG. 1. The optical recording medium of the present invention is of absorption coefficient control structure as described above, and it is preferable that substantially no recording/reproducing beam is reflected by the supporting substrate 20 to the side of the recording layer 4. The supporting substrate 20, therefore, is preferably constituted from a material which is transparent to the recording/reproducing beam or which absorbs the recording/ reproducing beam, or alternatively, a light absorption layer capable of absorbing the recording/reproducing beam is disposed between the supporting substrate 20 and the third dielectric layer 33. The situation is the same in the embodiments of FIGS. 1 and 2, and it is preferable that substantially no recording/reproducing beam is reflected by the protective layer 6 to the side of the recording layer 4. The protective layer 6, therefore, is preferably constituted from a material which is transparent to the recording/reproducing beam or which absorbs the recording/reproducing beam, or alternatively, a light absorption layer may be disposed between the protective layer 6 and the third dielectric layer 33.

The layers from the third dielectric layer 33 to the first dielectric layer 31 on the supporting substrate 20 are disposed in the order the same as the embodiment of FIG. 1 when viewed from the incident side of the recording/reproducing beam (from the side of the substrate 2).

The substrate 2 of FIG. 3 is a thin layer which is incapable of maintaining its shape by itself, and this substrate is formed, for example, by adhering a pressure sensitive sheet of a transparent resin. The substrate 2 generally has a thickness of about 0.05 to 0.3 mm although the thickness actually employed in the medium may vary by the particular material used.

In addition to the adhesion of a pressure sensitive sheet as mentioned above, the thin substrate 2 may be formed by coating a resin, for example, by spin coating.

With regard to the substrate 2 of FIG. 3, the region in the form of a concave or recess when viewed from the incident side of the recording/reproducing beam is the groove 21, and the region defined between the two adjacent grooves is the land 22. The concave/ridge pattern defined by the land 22 and the groove 21 of the substrate 2 may be provided by forming the corresponding concave/ridge pattern on the supporting substrate 20, disposing the dielectric layers, the recording layers and the like, and thereafter disposing the substrate 2 by the method as described above.

First Dielectric Layer 31 and Second Dielectric Layer 32

The first dielectric layer 31 plays the role of preventing oxidation of the recording layer and protecting the substrate by shutting off the heat which can otherwise conduct from the recording layer to the substrate upon recording. The second dielectric layer 32 plays the role of protecting the recording layer and helps the heat remaining in the recording layer after completion of recording release through heat transfer. Further, the provision of both the dielectric layers is effective for improving a degree of modulation.

The constitution of the first dielectric layer 31 and the constitution of the second dielectric layer 32 are not particularly limited. The dielectric layers 31 and 32, however, may preferably have the layer structure as described below in order to suppress the increase in jitter and bit error rate associated with the repeated overwriting operations and to thereby increase the number of overwritable operations.

The first dielectric layer 31 shown in the drawings comprises a dielectric layer 1a on the side of the substrate 2 and a dielectric layer 1b on the side of the recording layer 4. The dielectric layer 1a contains zinc sulfide and silicon oxide as its main components. The silicon oxide content of the dielectric layer 1a is in the range of 2 mol % to less than 40 mol % (not including 40 mol %), and preferably, 10 to 30 mol %. When the silicon oxide content of the dielectric layer 1a is too high, refractive index will be too small to realize high C/N ratio. When the silicon oxide content is too low, the number of overwritable operations will be reduced. The dielectric layer 1a may be either of homogeneous composition or of composition gradient structure in which the silicon oxide content varies incrementally or continuously.

The dielectric layer 1b may contain silicon nitride and/or germanium nitride as its main component(s), and preferably silicon nitride or germanium nitride as its main component, and more preferably germanium nitride as its main component. The composition of the germanium nitride is also not particularly limited, and exemplary composition is $Ge_xN_{1-x}$ (wherein x is in the range of 0.35 to 0.55). The composition of the silicon nitride is also not particularly limited, and exemplary composition is $Si_xN_{1-x}$ (wherein x is in the range of 0.35 to 0.55).

The second dielectric layer 32 may be either of single layer structure (see FIG. 1) or of laminate structure (see FIG. 2). In either case, the region of the second dielectric layer 32 in contact with the recording layer 4, namely, the entire second dielectric layer 32 in the case of FIG. 1 and the dielectric layer 2a in the case of FIG. 2 may preferably contain germanium nitride and/or silicon nitride; oxide of a rare earth metal; silicon oxide; or zinc sulfide and silicon oxide as its main component(s); and more preferably, germanium nitride and/or silicon nitride; or zinc sulfide and silicon oxide as its main component(s); and most preferably, germanium nitride or silicon nitride as its main component. When such region contains zinc sulfide and silicon oxide as its main components, the silicon oxide content is preferably at least 40 mol %, more preferably 40 to 80 mol %, and most preferably 40 to 60 mol %. When the silicon oxide content is too low, influence of the zinc and sulfur diffusion from the second dielectric layer 32 to the recording layer 4 will be significant, and when the silicon oxide content is too high, exfoliation is likely to take place in the second dielectric layer during the initialization and overwriting operations.

The rare earth metal element which may be employed in the second dielectric layer 32 is not limited to any particular type, and at least one rare earth metal element selected from Ce, La, Y, Pr, Nd, Pm, Sm, Eu, Gd, Tb, Dy, Ho, Er, Tm, Yb, Lu and the like may be employed. The rare earth metal element is preferably at least one of Ce, La and Y.

In the optical recording medium of FIG. 2, the composition of the dielectric layer 2b formed on the dielectric layer 2a is not particularly limited. The dielectric layer 2b, however, may generally contain zinc sulfide and silicon oxide as its main components. In such a case, the silicon oxide content is preferably in the range of 2 to less than 40 mol % (excluding 40 mol %) although the content may not necessarily be within such range.

It should be noted that the above-described silicon oxide content which should be fulfilled by each of the dielectric layers should be fulfilled not only as the average of each layer, and every part of the layer should be within such range.

The content of the silicon oxide used in the present invention is the value determined by $SiO_2/(ZnS+SiO_2)$ when the zinc sulfide and the silicon oxide are calculated in terms of ZnS and $SiO_2$, respectively, that is, after determining the amount of sulfur, zinc and silicon by fluorescent X-ray analysis. It should be noted that, when excessive zinc is present in relation to sulfur, or excessive sulfur is present in relation to zinc, the excessive zinc or sulfur is assumed to be present in the form of other compounds (such as ZnO or the like) or in free form, and the smaller one of the zinc content and the sulfur content is used in the determination of the ZnS content.

The first dielectric layer 31 is preferably 30 to 300 nm thick, and more preferably, 50 to 250 nm thick. When the first dielectric layer has such thickness, the damage to the substrate upon recording can be effectively prevented and higher degree of modulation is available.

The dielectric layer 1b may preferably have a thickness of at least 0.5 nm, and more preferably, at least 0.8 nm in order to ensure the barrier function. However, it should be noted that the thickness of the dielectric layer 1b is preferably limited to less than 5 nm, and in particular, to 4 nm or less when the dielectric layer 1b is formed from silicon nitride in order to prevent the exfoliation under high temperature, high humidity conditions. On the other hand, when the dielectric layer 1b is formed from germanium nitride, the layer is preferably deposited to a thickness of at least 5 nm for the purpose of enhancing the barrier function since the layer comprising germanium nitride is resistant to exfoliation under high temperature, high humidity conditions. The thickness of the dielectric layer 1b, however, is preferably limited to up to 40 nm, and more preferably, to up to 30 nm even if the layer comprises germanium nitride since improvement in the number of overwritable operations will be insufficient when the dielectric layer 1b is excessively thick. When the dielectric layer 1b is formed from a mixture of silicon nitride and germanium nitride, the thickness may be determined by taking the mixing ratio of the nitrides into consideration.

The ratio $(t_{1b}/t_1)$ of the thickness of the dielectric layer 1b $(t_{1b})$ to the thickness of the first dielectric layer $(t_1)$ is preferably up to 0.5, and more preferably, up to 0.4. Even if the thickness of the dielectric layer 1b were within the above-specified preferable range, the number of overwritable operations will not be sufficiently improved when the ratio $t_{1b}/t_1$ is too large.

The second dielectric layer 32 is preferably 10 to 50 nm thick, and more preferably, about 13 to 35 nm thick. This thickness range ensures a fast cooling rate and thus permits to define a record mark with a clear edge, resulting in reduced jitter. This thickness range also ensures higher degree of modulation. It should be noted that the region of the second dielectric layer in contact with the recording layer (for example, the dielectric layer 2a in the case of FIG. 2) may preferably have a thickness of at least 1 nm, and more preferably, a thickness of at least 5 nm. The region with an insufficient thickness will not play satisfactory role as a barrier layer.

The dielectric layer containing zinc sulfide may preferably contain an element whose standard free energy of sulfide formation is lower than the standard free energy of ZnS formation at 0 to 1000° C. (hereinafter referred to as metal element A). Incorporation of the metal element A in the dielectric layer results in the suppressed release of sulfur and zinc upon repeated overwriting, and increase of jitter is thereby prevented. This results in the increased number of overwritable operations.

The metal element A is preferably at least one member selected from Ce, Ca, Mg, Sr, Ba and Na, and use of Ce is most preferable in view of the low standard free energy of sulfide formation. For example, at 300K, the standard free energy of ZnS formation is about −230 kJ/mol, the standard free energy of CeS formation is about −540 kJ/mol, the standard free energy of CaS formation is about −510 kJ/mol, the standard free energy of MgS formation is about −390 kJ/mol, the standard free energy of SrS formation is about −500 kJ/mol, the standard free energy of BaS formation is about −460 kJ/mol, and the standard free energy of $Na_2S$ formation is about −400 kJ/mol.

In the ZnS-containing dielectric layer, the ratio of the metal element A to the total metal elements is less than 2 at %, preferably 1.5 at % or less, and more preferably 1.3 at % or less. When the ratio of the metal element A is in excess of such range, the effect of suppressing jitter increase upon repeated overwriting is not realized. It should be noted that the ratio of the metal element A is preferably at least 0.01 at %, and more preferably at least 0.03 at % for sufficient realization of the metal element A addition. The ratio of the metal element A to the total metal elements may be determined by fluorescent X-ray analysis or EPMA (electron probe X-ray microanalysis). It should be noted that semi-metal such as silicon is included in the "total metal elements" in the dielectric layer.

The metal element A in the dielectric layer may take form of simple substance, sulfide, oxide, fluoride, or the like.

The dielectric layers are preferably formed by vapor deposition such as sputtering and evaporation, and in particular, by sputtering. The dielectric layer 1b may be formed, for example, by the sputtering wherein silicon nitride and/or germanium nitride is used for the target, or by the reactive sputtering wherein the sputtering is effected in a nitrogen-containing argon atmosphere by using a target comprising Si and/or Ge.

When the dielectric layer of composition gradient structure is formed by sputtering, the dielectric layer may be formed, for example, by multi-target sputtering utilizing two or more targets and the ratio of the power applied to each target may be incrementally or continuously altered from the initial stage to the terminal stage of the film deposition.

The metal element A may be incorporated in the dielectric layer by various methods. For example, when the metal element A is cerium, a chip comprising cerium as simple substance or $CeO_2$ may be placed on the main target comprising the main components of the dielectric layer, or alternatively, cerium may be incorporated in the main target in the form of $CeO_2$ or other Ce compounds. When calcium or magnesium is used for the metal element A, it is possible to place a chip comprising CaO or MgO. Such oxides, however, have deliquescence, and use of such chip is undesirable. In such a case, a chip comprising $CaF_2$ or $MgF_2$ may be placed on the main target. The situation is similar when strontium, barium, sodium and the like are used for the metal element A, and use of fluoride chip is more preferable than oxide chip in view of the deliquescence. Alternatively, calcium, magnesium, strontium, barium, and sodium may be incorporated in the main target in the form of oxide or other compounds. The main target may comprise a multi-component target such as $ZnS-SiO_2$, or alternatively, ZnS and $SiO_2$ may be separately used for the main targets in multi-target sputtering.

When the metal element A as described above is incorporated in the dielectric layer, the sputtering is preferably effected in a mixed atmosphere of argon and oxygen. Introduction of the oxygen into the sputtering atmosphere is particularly effective when the sputtering is conducted by placing the chip comprising the metal element A as simple substance on the main target, but such oxygen introduction is also effective when the sputtering is conducted by placing the chip comprising the compound of the metal element A on the main target or by incorporating the compound of the metal element A in the main target. The amount of oxygen introduced into the sputtering atmosphere in terms of flow rate ratio between the inert gas such as argon and the oxygen $[O_2/(Ar+O_2)]$ is preferably 5 to 40%. Excessive introduction of the oxygen is undesirable since the recording power decreases with no difference in the erasing power, and the erasing power margin will be extremely narrow.

Recording Layer 4

The recording layer 4 has a thickness $t_R$ (nm) such that:

$$-100x+123 \leq t_R \leq -100x+126$$

when $$x=2W_G/(W_L+W_G)$$

as described above. When $t_R$ is too small, crosstalk in the groove from the land will be excessively high, and when $t_R$ is too large, crosstalk in the land from the groove will be excessively high.

The recording layer 4 is composed of a phase change type material of non-limited composition. The present invention, however, is particularly effective for an optical recording medium of phase change type having a recording layer of Ge-Sb-Te based system or In-Ag-Te-Sb based system, and in particular, the recording layer of Ge-Sb-Te based system.

In the recording layer of germanium (Ge)-antimony (Sb)-tellurium (Te) system, the atomic ratio of germanium, antimony and tellurium is preferably represented by the formula (I):

$$Ge_a Sb_b Te_{1-a-b} \qquad (I)$$

wherein letters a and b are respectively in the range: $0.08 \leq a \leq 0.25$ and $0.20 \leq b \leq 0.40$.

If the value of a is too small in formula (I), record marks are more unlikely to crystallize and the erasability would be lower. If the value of a is too large, much tellurium would bond with germanium with the resultant precipitation of antimony, inhibiting formation of record marks.

If the value of b is too small in formula (I), the content of tellurium would be too much and record marks are more likely to crystallize when the medium is stored at elevated temperature with a loss of reliability. If the value of b is too large, antimony would precipitate to inhibit formation of record marks.

In the recording layer of indium (In)-silver (Ag)-tellurium (Te)-antimony (Sb) system, the atomic ratio of indium, silver, tellurium, and antimony is preferably represented by the formula (II):

$$\{(In_a Ag_b Te_{1-a-b})_{1-c} Sb_c\}_{1-d} M_d \qquad (II)$$

wherein letters a, b, c and d are in the range: $0.1 \leq a \leq 0.3$, $0.1 \leq b \leq 0.3$, $0.5 \leq c \leq 0.8$, and $0 \leq d \leq 0.10$,
more preferably in the range: $0.11 \leq a \leq 0.28$, $0.15 \leq b \leq 0.28$, $0.55 \leq c \leq 0.78$, and $0.005 \leq d \leq 0.05$.

If the value of a is too small in formula (II), the indium content of the recording layer will be relatively too low and record marks will become less amorphous, resulting in a lower degree of modulation and lower reliability. If the value of a is too large, the indium content of the recording layer will be relatively too high and the reflectivity of regions other than record marks will become low, resulting in a lower degree of modulation.

If the value of b is too small in formula (II), the silver content of the recording layer will be relatively too low and the recrystallization of record marks, and hence, repetitive overwriting will become difficult. If the value of b is too large, the silver content of the recording layer will be relatively too high and excess silver will solely diffuse into the antimony phase during the recording and erasure. This results in lower rewriting durability, less stability of both the record marks and the crystalline regions, and a loss of reliability. Specifically, when the medium is stored at elevated temperature, record marks crystallize more to invite drops of C/N and degree of modulation. Additionally, the degradation of C/N and degree of modulation caused by repetitive recording is promoted.

If the value of a+b is too small, tellurium will become excessive to form a tellurium phase, which lowers the rate of crystal transition to hinder erasure. If the value of a+b is too large, it would become difficult to make the recording layer amorphous and it would become impossible to record signals.

If the value of c is too small in formula (II), change of reflectivity associated with a phase change will be sufficient, but erasure would be difficult due to markedly reduced rate of crystal transition. If the value of c is too large, change of reflectivity associated with a phase change will be insufficient to invite drop of degree of modulation.

The element M in formula (II) is at least one element selected from the group consisting of H, Si, C, V, W, Ta, Zn, Ti, Ce, Tb, Ge, Sn, Pb and Y. The element M is effective for improving rewriting durability, more specifically restraining the erasability from lowering as a result of repetitive rewriting. It is also effective for improving reliability under severe conditions such as hot humid conditions. At least one of V, Ta, Ce, Ge and Y is preferred among the elements M because their effects are more outstanding.

If the value of d which stands for the content of element M is too large, change of reflectivity associated with a phase change becomes too small to provide a sufficient degree of modulation. If the value of d is too small, effect of the addition of the element M will be insufficient.

Although it is preferred that the recording layer consists essentially of silver (Ag), antimony (Sb), tellurium (Te), indium (In), and optionally added M, it is acceptable that the silver is partially replaced by gold (Au); the antimony is partially replaced by bismuth (Bi); the tellurium (Te) is partially replaced by selenium (Se); and the indium (In) is partially replaced by aluminum (Al) and/or phosphorus (P).

The percent replacement of Ag by Au is preferably up to 50 at %, more preferably up to 20 at %. With a higher percent replacement, record marks are likely to crystallize, leading to a loss of reliability at elevated temperature.

The percent replacement of Sb by Bi is preferably up to 50 at %, more preferably up to 20 at %. With a higher percent replacement, the recording layer would have an increased coefficient of absorption. As a result, the optical interference effect and the difference in reflectivity between crystalline and amorphous regions are reduced, leading to a lower degree of modulation and a lower C/N.

The percent replacement of Te by Se is preferably up to 50 at %, more preferably up to 20 at %. With a higher percent replacement, the crystal transition would be retarded and the erasability be reduced.

The percent replacement of In by Al and/or P is preferably up to 40 at %, more preferably up to 20 at %. With a higher percent replacement, record marks would become less stable with a resultant loss of reliability. The proportion of Al and P is arbitrary.

It is noted that the recording layer of this composition system after repetitive rewriting has a coefficient of absorption k of about 3.3 in the crystalline state and about 2.2 in the microcrystalline or amorphous state.

The composition of the recording layer is identifiable by electron probe microanalysis (EPMA), X-ray microanalysis, ICP etc.

The recording layer is preferably formed by sputtering. The conditions for the sputtering are not critical, and when a material containing two or more elements are sputtered, the sputtering may be effected by using an alloy target or by using multi-target sputtering employing two or more targets.

Reflective Layer 5

The reflective layer 5 may comprise an extremely thin layer of a metal of high light transmission or a layer of silicon or germanium having a high transmission for the light of near infrared to infrared region including the recording/reproducing wavelength. The thickness of the reflective layer may be adequately determined to enable the control of the difference in the absorption coefficient between the region other than the record marks and the record marks as described above. The range of the preferable thickness of the reflective layer is significantly different by the material constituting the reflective layer, and the thickness may be determined in accordance with the material. When a metal such as Au is used for the reflective layer, the reflective layer may preferably have a thickness of up to 40 nm, and more preferably 10 to 30 nm. When Si or Ge is used for the reflective layer, the reflective layer may preferably have a thickness of up to 80 nm, and more preferably from 30 to 70 nm. A thickness below this range will invite decline of C/N, and a thickness beyond this range would provide no substantial improvement in the absorption correction effect.

When the reflective layer 5 is formed from a metal, the reflective layer may preferably comprise Au or an alloy thereof. The Au alloy may comprise the main component of Au and at least one alloying component selected from Al, Cr, Cu, Ge, Co, Ni, Mo, Ag, Pt, Pd, Ta, Ti, Bi and Sb.

The reflective layer 5 is preferably formed by vapor deposition such as sputtering and evaporation.

Third Dielectric Layer 33

The third dielectric layer 33 is preferably formed from a material adequately selected from the dielectric materials described in the explanation of the first and second dielectric layers.

The third dielectric layer may preferably have a thickness of 30 to 120 nm, and more preferably 40 to 90 nm. An excessively thin third dielectric layer results in the decline of the signal output, and an excessively thick third dielectric layer results in the erasure of the signals in the adjacent track (cross erase).

Protective Layer 6

The protective layer 6 is provided for improving scratch resistance and corrosion resistance. Preferably the protective layer is formed of an organic material, typically a radiation curable compound or a composition thereof which is cured with radiation such as electron and UV radiation. The protective layer is generally about 0.1 to 100 μm thick and may be formed by conventional techniques such as spin coating, gravure coating, spray coating, and dipping.

Adhesive Layer

When the embodiments shown in FIGS. 1 and 2 are applied for the optical recording medium of dual-side recording type, an adhesive layer is provided. The adhesive used for the adhesive layer is not limited to any particular type, and the adhesive may be a hot melt adhesives, a UV curing adhesive, or a room temperature curing adhesive, or alternatively, a pressure sensitive adhesive.

Other Features

In the optical recording medium of the present invention, the relation:

$\lambda max^i < \lambda u \leq \lambda min^i$, and more preferably, the relation:

$\lambda max^i < \lambda u < \lambda min^i$ is satisfied when the wavelength of a local minimum in reflectance spectrum is $\lambda min^i$; the wavelength of the local maximum in the reflectance spectrum nearest to the $\lambda min^i$ in the wavelength range shorter than the $\lambda min^i$ is $\lambda max^i$; and the wavelength used in the recording/reproduction is $\lambda u$. In the reflection spectrum of the optical recording medium, the wavelength range wherein reflection decreases with the increase in the wavelength and the wavelength range wherein reflection increases with the decrease in the wavelength appears alternately. The medium is designed in the present invention such that the reflectance is in its local minimum at the wavelength used, or the wavelength used is located in the wavelength region wherein reflection decreases with the increase in the wavelength to thereby reduce the difference between the crosstalk in the land and the crosstalk in the groove.

The reflectance spectrum is measured for the crystalline region, and generally for the crystalline region where no grooves are defined (mirror region).

The laser beam used for the recording/reproduction may have any desired wavelength $\lambda u$. However, the wavelength $\lambda u$ of the recording/reproduction beam is preferably such that:

$\lambda u \leq 680$ nm since the medium of the present invention is used in high density recording.

The numerical aperture NA of the lens in the recording/reproducing optical system is not particularly limited. The NA is preferably such that:

$NA \geq 0.6$ since reproduction of the medium recorded at high density is difficult when the NA is too small.

In the optical recording medium having the recording layer of the composition as described above, the light used for the recording and reproduction may be selected as desired from a wide range of wavelength, for example, from the range of 100 to 5000 nm.

In the recording and reproduction of the optical recording medium of the present invention, the linear velocity of the recording layer in relation to the laser beam is generally in the range of about 0.8 to 20 m/s, preferably at least 3.47 m/s, more preferably at least 6 m/s, and most preferably at least 10 m/s. The recording and the reproduction may be conducted at different linear velocity.

EXAMPLES

Next, the present invention is described in further detail by referring the Examples of the present invention which are given below by way of illustration and not by way of limitation.

Example 1

Optical recording disc samples of single substrate type having the constitution the same the one as shown in FIG. 1 except that the first dielectric layer 31 is of single-layer type were prepared by the procedure as described below.

A disc shaped substrate 2 having a diameter of 120 mm and a thickness of 0.6 mm was prepared by injection molding polycarbonate. A land having a width $W_L$ of 0.56 μm and a groove having a width $W_G$ of 0.64 μm were formed simultaneously with the injection molding on one major surface of the substrate such that:

$x = 2W_G/(W_L + W_G) = 1.07$

The groove was formed to a depth of $\lambda u/8.5$ n with the proviso that $\lambda u$ is the recording/reproducing wavelength which is 680 nm in the present invention, and n is the refractive index of the substrate.

The first dielectric layer 31 was formed by sputtering in argon atmosphere by using ZnS (85 mol %)–SiO$_2$ (15 mol %) for the target. Thickness of the first dielectric layer ($t_{d1}$) is shown in Table 1.

The recording layer 4 was formed by sputtering. The composition (atomic ratio) of the recording layer was $Ge_2Sb_2Te_5$.

The recording layer 4 was formed to a thickness $t_R$ of 18 nm since $t_R$ is in the range of:

$16 \leq t_R \leq 19$ when 1.07 is substituted for the x in the relation:

$-100x+123 \leq t_R \leq -100x+126$.

to be in the range of 5 to 10%. The samples had Ac/Aa at the wavelength of 680 nm in the range of 0.9 to 1.2. $\lambda max^i$ and $\lambda min^i$ were determined from the reflectance spectrum of each sample, and the values are shown in Table 1. The reflectance spectrum was evaluated for the mirror region.

The initialized samples were then evaluated for the crosstalk and bit error rate (BER) in the repeated overwriting operations with (1–7) RLL recording signals in an optical recording medium evaluator (numerical aperture NA: 0.6, linear velocity: 12 m/s). The recording/reproducing wavelength $\lambda u$ was 680 nm as described above, and the recording power and the erasing power were respectively set at the values at which the jitter was minimum. The results are shown in Table 1. It should be noted that BER is less than $1.0 \times 10^{-4}$.

TABLE 1

$x = 2W_G/(W_L + W_G) = 1.07$
$\lambda u = 680$ nm
$t_R = 18$ nm

| Sample No. | $t_{d1}$ (nm) | $\lambda max^i$ (nm) | $\lambda min^i$ (nm) | $|X_L|$ (dB) | $|X_G|$ (dB) | $|X_L-X_G|$ (dB) | BER Land | Groove |
|---|---|---|---|---|---|---|---|---|
| 101 | 230 | 490 | 680 | 20.5 | 24.5 | 4.0 | $1.5 \times 10^{-5}$ | $3.5 \times 10^{-6}$ |
| 102 | 240 | 490 | 710 | 21.0 | 22.1 | 1.1 | $7.5 \times 10^{-6}$ | $6.0 \times 10^{-6}$ |
| 103 | 250 | 500 | 730 | 22.5 | 21.0 | 1.5 | $4.5 \times 10^{-6}$ | $8.0 \times 10^{-6}$ |
| 104 (Comparative) | 220 | 480 | 640* | 18.5* | 26.0 | 7.5* | $3.0 \times 10^{-4}$** | $2.0 \times 10^{-6}$ |

*A value outside the scope of the invention.
**A value outside the preferable range.

The second dielectric layer 32 was formed as in the case of the first dielectric layer 31. The second dielectric layer was formed to a thickness of 15 nm.

The reflective layer 5 was formed by sputtering in argon atmosphere by using Si target. The reflective layer 5 was formed to a thickness of 50 nm.

The third dielectric layer 33 was formed as in the case of the first dielectric layer 31. The third dielectric layer was formed to a thickness of 60 nm.

The protective layer 6 was formed by applying a UV curable resin by spin coating and exposing it to UV for curing. The protective layer as cured had a thickness of 5 μm.

The thus produced samples were initialized by a bulk eraser. The crystal grain size of the recording layer after the initialization was about 100 nm. After the initialization, the medium from which the protective layer 6 had been removed was irradiated from the side of the substrate 2 with a laser beam at a wavelength of 680 nm to measure the light transmittance of the mirror region (crystalline region) with a spectrophotometer. The light transmittance was measured The results shown in Table 1 reveal the merits of the present invention. The samples satisfying the relation: $\lambda max^i < \lambda u \leq \lambda min^i$ exhibited reduced crosstalk in the land and the groove; reduced difference in the crosstalk between the land and the groove; and sufficiently reduced BER. In contrast, the samples not satisfying the relation: $\lambda max^i < \lambda u \leq \lambda min^i$ exhibited increased difference in the crosstalk between the land and the groove, and the crosstalk increased to beyond −20 dB (with the decreasing absolute value). Consequently, BER increased to over $1.0 \times 10^{-4}$.

Example 2

Optical recording disc samples were prepared by repeating the procedure of Example 1 except that the thickness $t_{d1}$ of the first dielectric layer was fixed to 245 nm, and the thickness $t_R$ of the recording layer was as shown in Table 2. The $\lambda max^i$ and the $\lambda min^i$ were in the ranges shown in Table 2, and they all satisfied the relation: $\lambda max^i < \lambda u \leq \lambda min^i$. The samples were evaluated as in the case of Example 1. The results are shown in Table 2.

TABLE 2

$x = 2W_G/(W_L + W_G) = 1.07$
$\lambda u = 680$ nm
$\lambda min^i = 710\sim730$ nm
$\lambda max^i = 490\sim500$ nm

| Sample No. | $t_R$ (nm) | $|X_L|$ (dB) | $|X_G|$ (dB) | $|X_L-X_G|$ (dB) | BER Land | Groove |
|---|---|---|---|---|---|---|
| 201 (Comparative) | 15* | 22.5 | 19.5* | 3.0 | $5.0 \times 10^{-6}$ | $1.5 \times 10^{-4}$** |
| 202 | 16 | 21.7 | 20.0 | 1.7 | $7.5 \times 10^{-6}$ | $3.0 \times 10^{-5}$ |

TABLE 2-continued $x = 2W_G/(W_L + W_G) = 1.07$
$\lambda u = 680$ nm
$\lambda min^i = 710\sim730$ nm
$\lambda max^i = 490\sim500$ nm

| Sample No. | $t_R$ (nm) | $|X_L|$ (dB) | $|X_G|$ (dB) | $|X_L-X_G|$ (dB) | BER Land | Groove |
|---|---|---|---|---|---|---|
| 203 | 17 | 22.0 | 20.5 | 1.5 | $4.5 \times 10^{-6}$ | $1.5 \times 10^{-5}$ |
| 204 | 18 | 21.3 | 21.4 | 0.1 | $5.0 \times 10^{-6}$ | $7.0 \times 10^{-6}$ |
| 205 | 19 | 20.5 | 21.7 | 1.2 | $1.0 \times 10^{-5}$ | $8.5 \times 10^{-6}$ |
| 206 (Comparative) | 20* | 19.3* | 22.0 | 2.7 | $1.5 \times 10^{-4}$** | $5.5 \times 10^{-6}$ |

*A value outside the scope of the invention.
**A value outside the preferable range.

The results shown in Table 2 reveal the merits of the present invention. The samples satisfying the relation: $\lambda max^i < \lambda u \leq \lambda min^i$ exhibited reduced difference in the crosstalk between the land and the groove as well as reduced crosstalk of the land and the groove. In contrast, the samples not satisfying the relation: $\lambda max^i < \lambda u \leq \lambda min^i$ exhibited increased difference in the crosstalk, and hence, increased BER of over $1.0 \times 10^{-4}$.

Example 3

Optical recording disc samples shown in Table 3 were prepared as in the case of Sample No. 102 of Example 1 except that x was altered by using different groove width $W_G$ and land width $W_L$. The samples were evaluated for difference $(G_{P-P}-L_{P-P})$ between the reproduction output in the groove $(G_{P-P})$ and the reproduction output in the land $(L_{P-P})$ by using the optical recording medium evaluator used in Example 1. $X_G$, $X_L$, x and the difference in the reproduction output (absolute value) are shown in Table 3.

TABLE 3

| Sample No. | $W_G$ (μm) | $W_L$ (μm) | x | $|G_{P-P}-L_{P-P}|$ (mV) |
|---|---|---|---|---|
| 301 (Comparative) | 0.60 | 0.60 | 1.00* | 90 |
| 302 | 0.62 | 0.58 | 1.03 | 50 |
| 303 | 0.63 | 0.57 | 1.05 | 20 |
| 304 | 0.64 | 0.56 | 1.07 | 0 |
| 305 | 0.66 | 0.54 | 1.10 | 30 |
| 306 | 0.68 | 0.52 | 1.13 | 60 |

*A value outside the scope of the invention.

As shown in Table 3, the difference in the reproduction output between the groove and the land can be critically reduced when $x \geq 1.03$.

Samples having the structures of FIGS. 1 and 2 wherein the dielectric layer is of laminate structure were prepared, and these samples were also evaluated as described above. The results obtained were similar to those of the above-described Examples depending on the relation between $\lambda max^i$, $\lambda u$ and $\lambda min^i$, and the thickness $t_R$ of the recording layer.

Japanese Patent Application Nos. 367343/1997 and 347947/1998 are incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. An optical recording medium comprising a substrate, and a first dielectric layer, a recording layer of phase change type, and a second dielectric layer formed on one surface of the substrate in this order, wherein recording/reproducing beam is irradiated from the other surface of the substrate, wherein said medium has a light absorption coefficient at the wavelength of said recording/reproducing beam such that:

$Ac/Aa \geq 0.8$ when light absorption coefficient in crystalline region is Ac and light absorption coefficient in amorphous region is Aa;

said substrate has a groove and a land on its surface, and said groove has a width $W_G$ and said land defined between two adjacent grooves has a width $W_L$ such that:

$x = 2W_G/(W_L+W_G) \geq 1.03$; and crosstalk in the reproduction of said land $X_L$ from the groove and crosstalk in the reproduction of said groove $X_G$ from the land are such that:

$|X_L| \geq 20$ dB, $|X_G| \geq 20$ dB, and $|X_L-X_G| \leq 5$ dB, when both the groove and the land are used for recording tracks.

2. The optical recording medium according to claim 1 wherein the relations:

$\lambda max^i < \lambda u \leq \lambda min^i$, and $-100x+123 \leq t_R \leq -100x+126$ are satisfied when the wavelength of a local minimum in reflectance spectrum is $\lambda min^i$; the wavelength of the local maximum in the reflectance spectrum nearest to the $\lambda min^i$ in the wavelength range shorter than the $\lambda min^i$ is $\lambda max^i$; said recording/reproducing beam has a wavelength of $\lambda u$; and said recording layer has a thickness of $t_R$ (nm).

3. The optical recording medium according to claim 1 or 2 wherein the medium has a reflective layer on the second dielectric layer, and the reflective layer is either the one comprising a metal having a thickness of up to 40 nm, or the one comprising Si or Ge having a thickness of up to 80 nm.

4. The optical recording medium according to claim 3 wherein the medium has a third dielectric layer on the reflective layer.

* * * * *